Jan. 12, 1965
G. A. GOEPFRICH ETAL
3,165,325
POWER OPERATED CHUCK
Filed Dec. 10, 1962
2 Sheets-Sheet 2
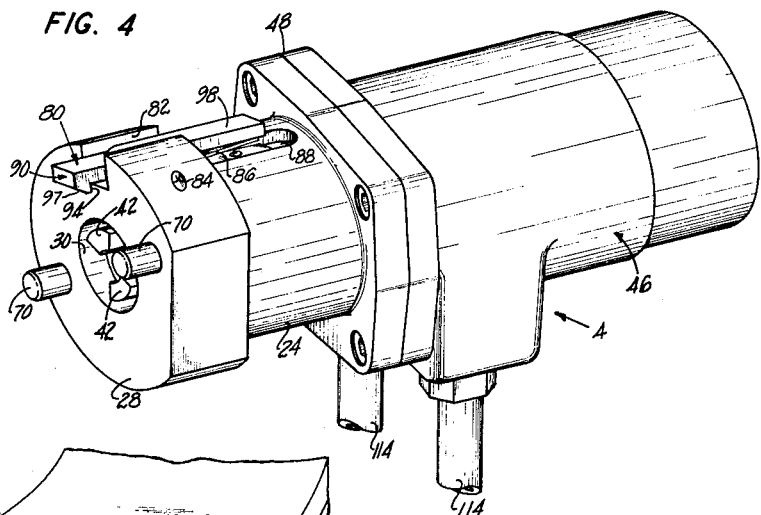
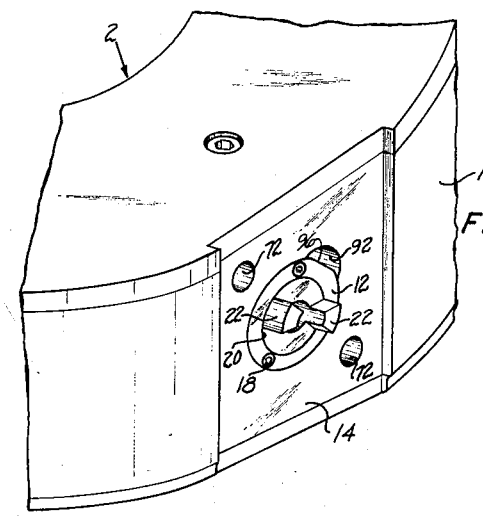
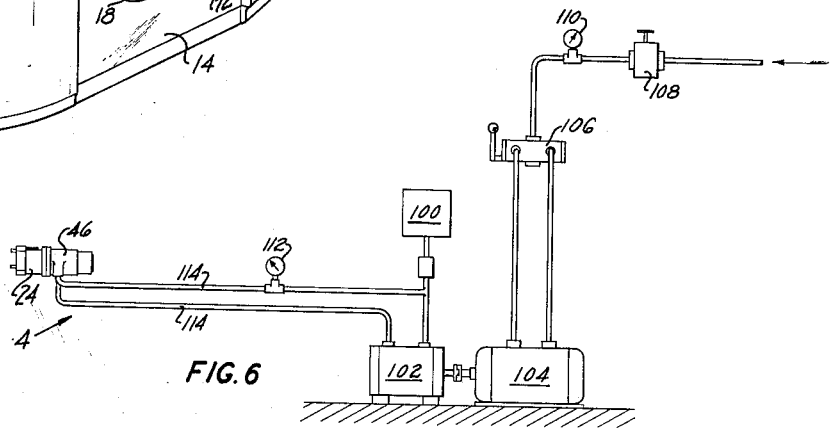
INVENTORS
GEORGE A. GOEPFRICH
HOWARD C. MULTER
JOHN J. RODDY
BY Lindsey, Prutzman and Hayes
ATTORNEYS

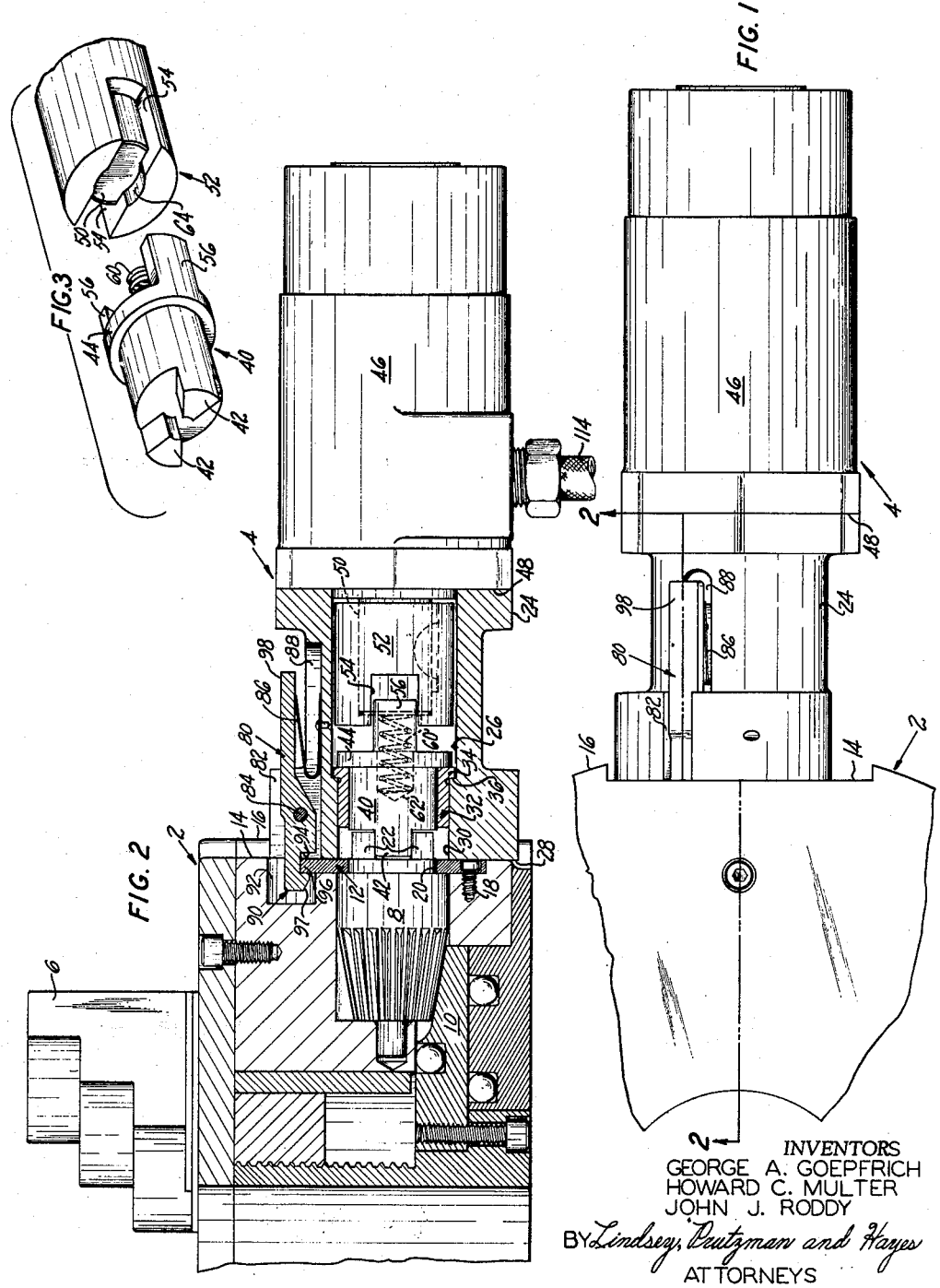

United States Patent Office 3,165,325
Patented Jan. 12, 1965

3,165,325
POWER OPERATED CHUCK
George A. Goepfrich, New Britain, Howard C. Multer, West Hartford, and John J. Roddy, Meriden, Conn., assignors to Skinner Precision Industries, Inc., New Britain, Conn., a corporation of Connecticut
Filed Dec. 10, 1962, Ser. No. 243,414
9 Claims. (Cl. 279—4)

This invention generally relates to chucks and more particularly to an improved power operated chuck.

One of the objects of the present invention is to provide an improved chuck wherein the jaws are conveniently and efficiently operable by a high power drive mechanism that is disassociated from the chuck during normal use of the chuck.

A further object of the present invention is to provide, in association with such a chuck, a novel portable power drive mechanism for the chuck jaws that will provide a high output torque and that can be easily and securely mounted to the chuck without special support attachments while being quickly and easily removable from the chuck for use on other chucks or for storage purposes. Included in this object is the provision of such a portable drive mechanism that may be fixed in operating position without requiring extensive supporting fixtures and wherein it will effectively distribute the reaction forces of operation to the chuck.

A still further object of the present invention is to provide such a drive mechanism that may be operated with a minimum of skill and without endangering the workpiece and that is powered by a hydraulic system which permits the operator to accurately and sensitively control the movement of the chuck jaws thereby highly facilitating workpiece loading and unloading.

A still further object of the present invention is to provide a novel power drive mechanism for operating the jaws of a chuck, which will attain the above objects in a structure that is relatively economical to manufacture and that is rugged in construction so as to provide effective service over long periods of use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a fragmental plan view of a chuck and a portable power drive mechanism embodying the present invention;

FIG. 2 is a partial cross-sectional view taken generally along lines 2—2 of FIG. 1;

FIG. 3 is an exploded perspective view of internal parts of the power drive mechanism, one of the parts being broken away;

FIG. 4 is a fragmental perspective view of the portable power drive mechanism;

FIG. 5 is a fragmental perspective view of the chuck; and

FIG. 6 is a schematic view of a control system for the drive mechanism of the present invention.

Referring to the drawings in detail, an embodiment of the present invention is shown by a chuck generally designated 2 and a portable power drive mechanism generally designated 4 for actuating the chuck jaws 6. The shown chuck 2 is of the wedge screw type having a pinion 8 and a ring gear 10 in mesh therewith as shown in FIG. 2, which gears are utilized in actuating the chuck jaws 6 as described in United States Patent No. 2,993,701 issued on July 25, 1961, and assigned to the assignee of the present invention. The pinion 8 is constrained against axial movement in the shown embodiment by a retaining plate 12 secured to a recessed ledge 14 in the outer peripheral wall 16 of the chuck by bolts 18. The retaining plate 12 has an opening 20 through which there extends outwardly of the chuck body a plurality of clutch-like projections 22 provided on the pinion 8.

In the specific embodiment, the portable drive mechanism 4 includes a casing 24 preferably formed from cast aluminum or the like and having a through passage 26 of generally cylindrical cross section opening into a flat face 28 at one end of the casing. The end face 28 of the casing is dimensioned to be received in the recessed ledge 14 of the chuck with the face 28 flatly contacting the ledge as shown in FIG. 1 while the passage 26 is dimensioned to receive the pinion clutch projections 22, as shown in FIG. 2. The passage 26 has a reduced diameter portion 30 which receives a press-fitted bushing 32 having a flange 34 abutting against shoulder 36 formed by the reduced diameter portion 30 of the passage 26.

A generally cylindrical clutch member 40 is mounted for rotary and sliding movement in the bushing 32 and is provided with a pair of projections 42 configured to engage the projections 22 of the pinion 8, as shown in FIG. 2, to establish a drive connection. As best shown in FIG. 3, the clutch member 40 is formed with an enlarged or flange portion 44 adapted to engage a stop provided by the flange 34 of the bushing 32 to limit leftward movement (as viewed in FIG. 2) of the clutch member.

In accordance with the invention, the clutch member 40 is driven by a suitable hydraulic motor generally designated 46 bolted to the rear face 48 of the casing 24, and having a stub shaft 50 extending into the passage 26 of the casing. The stub shaft 50 is connected to the clutch member 40 to drive the latter by means of a sleeve adaptor 52 which receives the shaft 50 and is suitably keyed thereto for movement therewith. The adaptor 52 is apertured to provide a pair of diametrically opposed axially extending slots 54 in its peripheral wall which slots 54 receive a mating pair of arms 56 formed on the clutch member 40 to thereby establish a rotary drive connection between the shaft 50 and the clutch member 40. However, the adaptor slots 54 are dimensioned to permit sliding movement of the clutch member 40. A compression spring 60 is provided to bias the clutch member 40 toward the front face 28 of the casing 24. In the shown embodiment, the spring 60 has one end received in a socket 62 formed in the clutch member 40 while the other end of the spring 60 extends through an opening 64 in the front wall of the adaptor 52 and abuts against the stub shaft 50 of the motor 46.

In order to mount the drive mechanism 4 to the chuck 2 for use, the casing 24 is provided with a pair of pins 70 extending from the end face 28 (see FIG. 4) and dimensioned to be received in mounting holes 72 provided in the chuck on opposite sides of the pinion 8, as shown in FIG. 5. The pins 70 and mounting holes 72 are positioned such that when the casing 24 is so mounted to the chuck, the projections 22 of the pinion 8 extend into the passage 26 to be engaged by the projections 42 of the clutch member 40. Should the projections 42 of the clutch member 40 not be properly aligned for engagement, the clutch member 40 will move to the right (as viewed in FIG. 2) against the biasing force of the spring 60, however, upon sufficient rotation of the clutch member 40 relative to the pinion 8, the spring 60 will force the clutch member in the opposite direction into proper engagement with the pinion 8 to establish the drive connection. The pins 70, in addition to mounting and properly positioning the drive mechanism 4 with respect to the chuck 2, also serve to effectively distribute to the chuck 2, the reaction forces imparted to the drive mechanism 4 during actuation of the chuck jaws 6.

A latch for locking the drive mechanism 4 to the chuck is provided, which in the shown embodiment, comprises a lever 80 extending through a channel 82 provided in the casing 24 and pivotally connected thereto by a pivot pin 84 extending through the lever 80 and fixed to the casing. The lever 80 is biased in a counterclockwise direction (as viewed in the drawings) by a leaf spring 86 having one leaf suitably secured in a recess 88 of the casing and having the other leaf bearing against the underside of the lever 80. The forward or nose portion 90 of the lever 80, which is dimensioned to project beyond the casing and into a recess 92 provided in the chuck adjacent the retaining plate 12, is provided with a notch 94 adapted to receive edge portion 96 of the retaining plate 12 as shown in FIG. 2 to lock the drive mechanism 4 in its mounted position with respect to the chuck. If desired, the nose 90 of the lever 80 may be provided with an inclined cam surface 97 engageable with the edge portion 96 of the lever to effect automatic latching of the lever upon insertion of the chuck pins 70 into the mounting holes 72 of the chuck. Unlatching of the lever 80, to remove the drive mechanism from the chuck, is simply accomplished by depressing the portion 98 of the lever so as to clear the nose portion 90 thereof from the edge portion 96 of the retaining plate 12.

Referring to the schematic of FIG. 6, a control system for the drive mechanism 4 is provided including a hydraulic reservoir 100, a pump 102, an air motor 104 for operating the pump and a suitable control valve 106 for supplying and exhausting the air motor 104. A pressure regulator 108 is provided to control the inlet air pressure, which pressure is indicated by a low pressure gauge 110, while a high pressure gauge 112 is provided in one of the hydraulic conduits 114 and calibrated for torque indication. The supply and exhaust conduits 114 of the hydraulic motor 46 are provided by flexible tubing of sufficient length so as to greatly facilitate the use of the drive mechanism 4. If the machine on which the chuck is mounted is provided with a hydraulic system, it is conceivable that the drive mechanism of the present invention could be powered by such system thereby eliminating the need of the air motor 104 and its associated control apparatus.

From the foregoing, it will be seen that the present invention provides an improved chuck having jaws that are easily and effectively operable, under sensitive control, by a novel portable power mechanism of high adaptability, that will provide a high output torque and that may be simply and rapidly applied to or removed from, the chuck.

As will be apparent to persons skilled in the art, various modifications and adaptations of the structure above described will become readily apparent without departure from the spirit and scope of the invention, the scope of which is defined in the appended claims.

We claim:
1. In combination with a chuck having jaws and a ring gear and cooperable pinion for operating the jaws, said pinion having projections extending from the chuck, a portable drive mechanism comprising a casing having a through passage, means removably mounting the casing to the chuck with the through passage in alignment with the pinion projections, a clutch member mounted in the passage for rotatable movement and having means engaging the pinion projections establishing a drive connection, and power means for rotating the clutch member to drive the pinion for operating the jaws.

2. The combination defined in claim 1, wherein the power means includes a hydraulic motor supported by the casing and means for supplying and exhausting hydraulic fluid to and from the motor, respectively.

3. In combination with a chuck having jaws and a pinion for operating the jaws, a portable drive mechanism for actuating the pinion comprising a casing having a through passage, means on the casing and the chuck including a pin and a pin-receiving hole removably mounting the casing to the chuck with the through passage in alignment with the pinion, a clutch member mounted for rotary and sliding movement in the passage and having means engaging the pinion establishing a drive connection, resilient means in the passage urging the clutch member into engagement with the pinion and power means for rotating the clutch member to drive the pinion for operating the jaws.

4. In combination with a chuck having jaws, a pinion for operating the jaws and a plurality of mounting holes on opposite sides of the pinion, a portable drive mechanism for actuating the pinion comprising a casing having a through passage and a plurality of pins removably received in the mounting holes mounting the casing to the chuck with the passage in general alignment with the pinion, a clutch member mounted for rotatable and sliding movement in the passage and having means engageable with the pinion to establish a drive connection, resilient means in the passage urging the clutch member into engagement with the pinion, power means for rotating the clutch member to drive the pinion, and a releasable latch means including a lever pivotally mounted to the casing and having one end extending into the chuck and engaging a portion thereof for preventing withdrawal of the pins from the mounting holes.

5. A chuck comprising a body having radially movable jaws, means for operating the jaws including a pinion mounted in the chuck body and having portions projecting outwardly from the chuck body, a retaining plate fixed to the chuck body about the pinion and engaging the pinion to prevent axial movement thereof, said body having a plurality of mounting holes on opposite sides of the pinion and having a recess adjacent one edge portion of the retaining plate, a portable drive mechanism for actuating the pinion comprising a casing having a through passage and a plurality of pins removably received in the mounting holes of the chuck respectively mounting the casing to the chuck with the passage in alignment with the pinion, a clutch member mounted for rotary and sliding movement in the passage and having means engageable with said pinion portions to establish a drive connection, spring means in the passage urging the clutch member into engagement with the pinion, power means for rotating the clutch member to drive the pinion, and a releasable latch comprising a lever pivotally mounted to the casing externally thereof and having a nose portion extending into said chuck recess, said nose portion having a notch received by said edge portion of the retaining plate, and a spring means between the lever and the casing, biasing the lever into latching position.

6. For use with a chuck having jaws and a pinion for operating the jaws, a portable drive mechanism for actuating the pinion comprising a casing having a through passage and an end face adapted to be placed against the chuck with the passage in alignment with the pinion, a clutch member mounted for rotary and sliding movement in the passage and having end projections adapted to engage the pinion to establish a drive connection, spring means biasing the clutch member towards said end face to position the clutch projections generally at said end face, stop means in the passage limiting movement of the clutch member towards said end face, and power means including a motor supported on the casing for rotating the clutch member to drive the pinion.

7. The portable drive mechanism, as defined in claim 6, wherein the motor is hydraulically driven and wherein the power means includes means for supplying and exhausting hydraulic fluid to and from the motor respectively and a gauge for indicating the output torque of the motor.

8. For use with a chuck having jaws and a pinion for operating the jaws, a portable drive mechanism for actuating the pinion comprising a casing having a through passage and one end adapted to be placed against the chuck with the passage in alignment with the pinion, a clutch member mounted for rotary and sliding movement in the passage and having projections at one end adapted to engage the chuck pinion to establish a drive connection, the other end of the clutch member having a plurality of arms projecting axially therefrom, a motor mounted to the other end of the casing having an output shaft extending into the passage, an adaptor connected to the output shaft and having a plurality of axially extending slots respectively receiving the arms of the clutch member to establish a rotary drive connection between the output shaft and the clutch member, a spring between the clutch member and the output shaft biasing the clutch member towards said one end and stop means in the passage limiting movement of the clutch member towards said one end.

9. For use with a chuck having jaws, a pinion for operating the jaws and a plurality of mounting holes on opposite sides of the pinion, a portable drive mechanism for actuating the pinion comprising a casing having a through passage and one end face, a plurality of mounting pins projecting from said one end face adapted to be received in the holes of the chuck for mounting the casing to the chuck with the passage in general alignment with the pinion, a clutch member mounted for rotatable and sliding movement in the passage and having means adapted to engage the pinion to establish a drive connection, power means for rotating the clutch member to drive the pinion including a motor mounted to the other end face of the casing, and a releasable latch means mounted on the casing adapted to engage the chuck to prevent withdrawal of the mounting pins therefrom.

References Cited by the Examiner
UNITED STATES PATENTS

| | | | |
|---|---|---|---|
| 1,874,888 | 8/32 | Burrell | 279—1 |
| 2,233,163 | 2/41 | Fosnot | 173—163 |
| 2,563,970 | 8/51 | Sloan | 279—1 |
| 3,045,648 | 7/62 | Belau | 173—163 |

ROBERT C. RIORDON, *Primary Examiner.*

FRANK SUSKO, *Examiner.*